Figure 1:
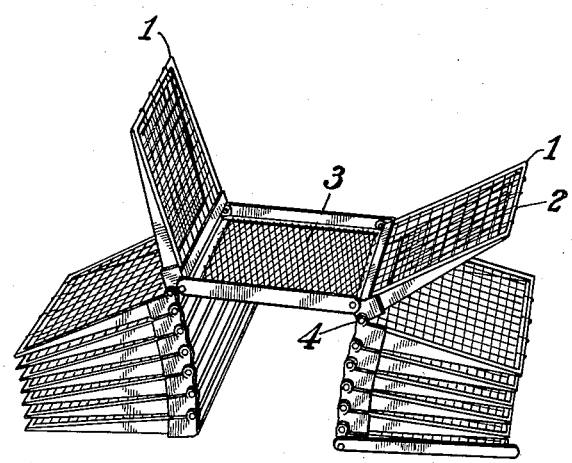

May 21, 1940.   G. R. McCORMICK ET AL   2,201,628
RENEWABLE TYPE FILTER
Filed Nov. 16, 1938   3 Sheets-Sheet 1

GORDON R. McCORMICK
ROLLO G. RUSSELL   INVENTORS.

BY
Frank C. Hilberg   ATTORNEY

May 21, 1940.　　　G. R. McCORMICK ET AL　　　2,201,628
RENEWABLE TYPE FILTER
Filed Nov. 16, 1938　　　3 Sheets-Sheet 2

GORDON R. McCORMICK
ROLLO G. RUSSELL　　INVENTORS

BY

Frank C. Hilberg　ATTORNEY

May 21, 1940.   G. R. McCORMICK ET AL   2,201,628
RENEWABLE TYPE FILTER
Filed Nov. 16, 1938   3 Sheets-Sheet 3

GORDON R. McCORMICK
ROLLO G. RUSSELL   INVENTORS.

BY
Frank C. Hilberg ATTORNEY.

Patented May 21, 1940

2,201,628

UNITED STATES PATENT OFFICE 2,201,628

RENEWABLE TYPE FILTER

Gordon R. McCormick and Rollo G. Russell, Flint, Mich., assignors to E. I. du Pont de Nemours & Company, Wilmington, Del., a corporation of Delaware Application November 16, 1938, Serial No. 240,648

2 Claims. (Cl. 210—181)

This invention relates to a filter for filtering fluids including comparatively thick liquids and more particularly to an apparatus in which a large area of filter paper or other filtering medium may be used efficiently in a relatively small compact unit. In the manufacture of liquids it frequently is necessary to remove all traces of foreign matter. Examples of such liquids are gasoline, oil, syrup, organic chemicals, paints, lacquers and enamels of various kinds. It will be readily apparent that the invention also covers screening as well as filtering. An example of the former would be the removal of sand and dirt from gasoline.

In the preparation of paints, enamels and lacquers a small amount of pigment, grit, sand, hair, wood, or the like would clog the spray gun if the material were subsequently used for spraying or if the coating composition were applied by a brush the resulting finish would be rough and would lack the high gloss, smooth luster which is demanded of high-grade enamels at the present time. Therefore the invention is particularly suitable for filtering such difficultly filterable liquids.

Many devices are on the market which will filter fluids of the class mentioned above. Such filters, however, which are efficient are invariably large, massive, complicated affairs and are relatively expensive. Those which are simple and light in construction usually clog easily or they merely strain out the large particles present in the liquids.

An object of the present invention therefore is the provision of a filter which is highly efficient and is light, compact, and inexpensive. Another object of the present invention is the provision of a filter which has great flexibility with respect to the kind and nature of the fluid to be filtered and also with respect to the filtering media; that is, the filter paper, cloth or metal screen which actually does the filtering. In the present invention these filtering screens may be of a widely different character and may be used alone or in combination; for example, the filter may be coarse or fine depending on the nature of the fluid to be filtered. A still further object of the present invention is the provision of a filter in which a very large surface of the filtering media is in contact with the fluid to be filtered in a device which is very compact.

These objects are accomplished by a frame provided with leaves on its opposite sides which fold toward the center and around which a long length of filter paper or other media is passed. This unit is then placed in a housing provided with an inlet and an outlet. Around the filter unit on the outlet side is a gasket such that when the fluid to be filtered is supplied through the inlet under a pressure of a few pounds per square inch or more, the filtering unit is forced tightly against the gasket surrounding it on the outlet end.

Figure 3:
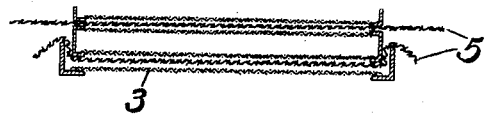
Figure 2:
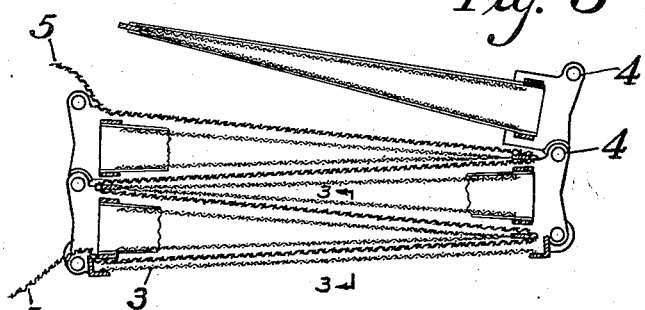
Figure 8:
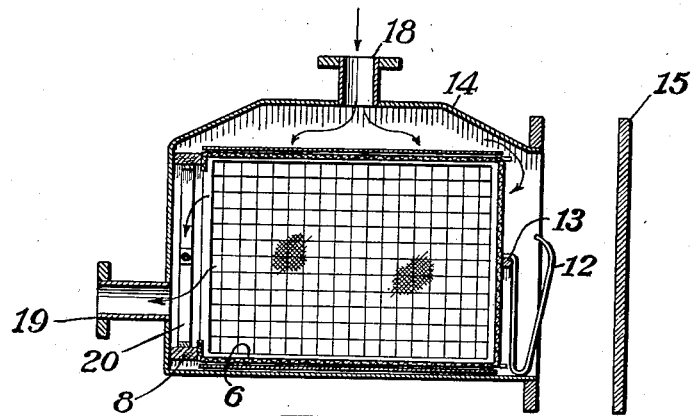
Figure 4:
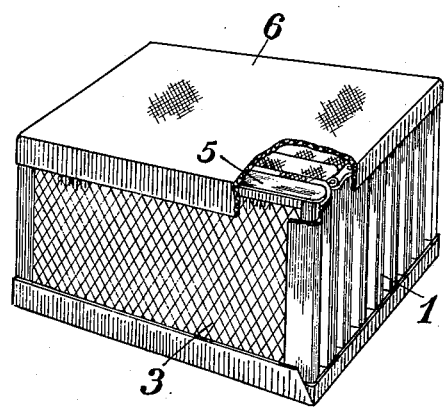
Figure 6:
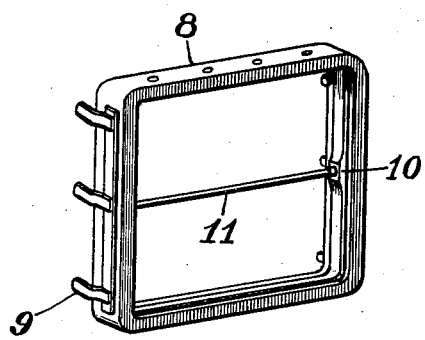
Figure 7:
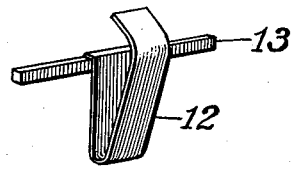
Figure 5:
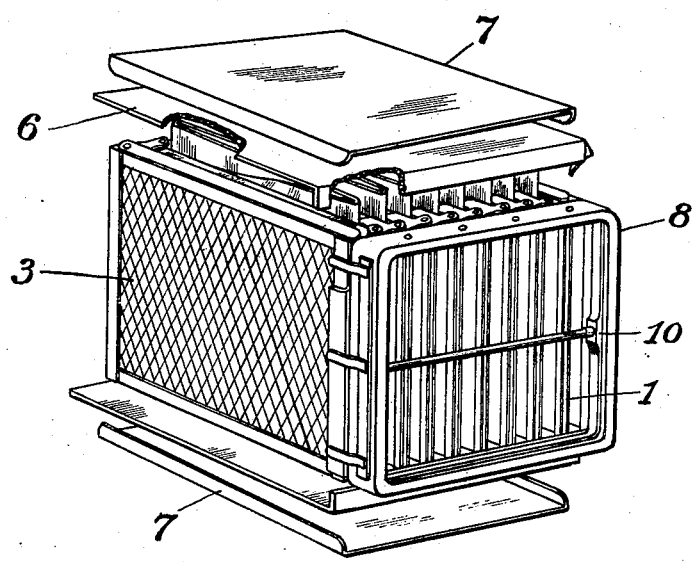

Figure 1 is a plan view of the filter unit in a position ready to receive the filter cloth or other medium. Figure 2 is a partial detailed view of Figure 1 in which the fabric has been inserted between and around three of the leaves. Figure 3 is a section along line 3—3 of Figure 2. Figure 4 is a plan view of the filter unit in which the filter paper or cloth has been placed in position and another piece of similar fabric has been placed on the top and bottom of the filter unit. Figure 5 is a plan view of the filter unit similar to Figure 4 except that the top and bottom plates are shown in their respective positions. Figure 6 is a detailed view of a gasket which is placed against the outlet end of the filter. Figure 7 is a detailed view of a spring which holds the filter unit securely against the outlet end in the filter housing. Figure 8 is a section through the housing with the filter unit placed within it.

In all figures the same numerals refer to the same parts. In Figure 1 the leaves are designated as 1. Around these leaves is a supporting screen 2 which is prepared from a coarse mesh, heavy wire. The bottom or base leaf is shown as 3. The leaves are hinged about two pivots indicated as 4. The fabric through which the liquid is passed to accomplish filtration is designated as 5. In Figure 5 a strip of a similar fabric shown as 6 is placed over and under the filter unit. This cloth 6 may be omitted if desired. On top of the cloth 6 is placed a thin, tightly fitting cover 7 and a similar pan is placed next to the cloth covering the bottom also indicated as 7. A heavy gasket of felt or similar material shown as 8 provided with springs 9 is clamped into place over the outlet end of the filter unit. This gasket is usually hinged at a center point shown as 10 in Figure 6. The hinge itself, however, is not shown. The hinge is used to facilitate placing the gasket and the softness of the gasket takes care of any irregularities in the contours of the filter or housing between which the gasket is placed. The bar 11 is designed to support the gasket and avoid deformation. After the unit is placed within the housing and before the liquid to be filtered is supplied, the spring 12 attached to the rod 13 is placed against the ends of the filter leaves 1 to hold the filter unit against the outlet opening. After the unit is in place within the housing 14, a cover 15 is placed over the opening of the housing and is held in place by means of clamps or other means not shown. The housing is provided with an inlet 18 and an outlet 19.

In the operation of the filter the liquid to be filtered enters through the inlet 18 of the housing 14. The liquid then flows as shown by the arrows over the top of the unit and down the sides and fills the entire housing. The liquid then passes through the filter cloth 5 which does the filtering. It then accumulates in the opening 20, and when this is filled passes through the outlet 19.

In preparing the unit for use the filter unit is placed on a table before the operator in the position shown in Figure 1. A filter paper, cloth, or other medium in the form of a roll is unwound and placed on the member 3 shown in Figure 1 and allowed to extend over the next leaf to which the numeral 1 is attached in Figure 1. The corresponding leaf 1' is then swung to a horizontal position over the cloth. The cloth is then passed to the left over this leaf and the leaf marked 1 in Figure 1 is brought to a horizontal position over the cloth. This zigzag arrangement is continued as shown in Figure 2 until all of the leaves are in horizontal position (not shown). The unit is then covered with a cloth over the top and bottom as shown in Figure 4. The gasket 8 is then slipped into position against the outlet end and the tightly fitting pans 7 are placed on top and underneath of the filter unit. It is then placed in the housing 14 and the spring assembly 12 and 13 is put in place. The cover 15 is then placed over the end and secured in place by means of clamps or other suitable device. The filter is then ready for use and may be attached to the tank containing the liquid to be filtered in any convenient manner. Figure 8 shows a portion of a flange union for this purpose. The filtrate is collected from the outlet 19 which is usually provided with a flexible hose or pipe which leads to a suitable receptacle.

It is to be understood that the inlet may be in any side except within the gasket around the outlet. Likewise the outlet may be on any side which convenience may dictate so long as the liquid flows through the filtering medium before it passes through the outlet.

The advantages of the present invention are that the filter herein disclosed is very light and compact and offers a large area of filtering medium to the liquid or gas to be filtered. The rate of flow, therefore, through the filter is relatively large.

The present invention may be used for filtering gases of all kinds, liquids such as gasoline, oils, paints, lacquers, enamels, solvents, thinners, and even heavy liquids such as finger nail enamels and the like.

It is apparent that many widely different embodiments of this invention may be made without departing from the spirit and scope thereof, and therefore, it is not intended to be limited except as indicated in the appended claims.

We claim:

1. A filter unit comprising a plurality of hinged interlocking leaves and a filter medium of greater width than the leaves folded over each leaf; a tightly fitting cover over the edges from which the filtering medium protrudes; a gasket about the periphery of the outlet end of the filter; a fluid tight housing completely enclosing the filter unit provided with an inlet and an outlet and means to hold the unit tightly against the outlet side whereby the fluid to be filtered may enter the unit from three sides but is excluded from the outlet side.

2. A filter unit comprising a plurality of V shaped hinged interlocking leaves, said leaves having a heavy wire screen on their two equal sides, a filter medium passing over the interlocking leaves; a tightly fitting cover over the edges of the said leaves; a gasket about the periphery of the outlet end of the filter unit; a fluid tight housing completely enclosing the filter unit provided with an inlet and an outlet and means to hold the filter unit tightly against the outlet side whereby the liquid to be filtered may enter from three sides but is excluded from the outlet side.

GORDON R. McCORMICK.
ROLLO G. RUSSELL.